(12) United States Patent
Bergmann et al.

(10) Patent No.: US 8,460,502 B2
(45) Date of Patent: Jun. 11, 2013

(54) METHOD AND TOOLING FOR MANUFACTURE OF CO-CURED COMPOSITE STRUCTURES

(75) Inventors: Blaise F. Bergmann, Clearwater, KS (US); Dwight D. Spaulding, Rose Hill, KS (US); John P. McPherson, Haysville, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 41 days.

(21) Appl. No.: 13/086,618

(22) Filed: Apr. 14, 2011

(65) Prior Publication Data

US 2012/0261057 A1 Oct. 18, 2012

(51) Int. Cl.
| | |
|---|---|
| *B29C 65/00* | (2006.01) |
| *B29C 45/00* | (2006.01) |
| *B32B 17/10* | (2006.01) |
| *B32B 37/00* | (2006.01) |
| *B32B 38/00* | (2006.01) |
| *B31B 1/60* | (2006.01) |
| *B29B 15/00* | (2006.01) |
| *B29C 39/14* | (2006.01) |
| *B29C 55/00* | (2006.01) |
| *B29C 67/20* | (2006.01) |
| *B29C 43/10* | (2006.01) |
| *B29D 7/00* | (2006.01) |

(52) U.S. Cl.
USPC ............ 156/283; 156/285; 156/286; 156/60; 156/382; 264/511; 264/526; 264/512; 264/553; 264/566; 264/568; 264/571; 425/504; 425/388; 425/405.1; 425/405.2

(58) Field of Classification Search
USPC ............ 156/60, 283, 285, 286, 382; 264/511, 264/512, 526, 553, 566, 568, 571; 425/388, 425/405.1, 405.2, 504
See application file for complete search history.

(56) References Cited

U.S. PATENT DOCUMENTS

| | | | |
|---|---|---|---|
| 5,366,684 A | * | 11/1994 | Corneau, Jr. .................. 264/510 |
| 5,746,553 A | | 5/1998 | Engwall |
| 2008/0302915 A1 | * | 12/2008 | Yip et al. ...................... 244/132 |
| 2011/0084428 A1 | * | 4/2011 | Wade et al. ................... 264/511 |

* cited by examiner

*Primary Examiner* — Christopher Schatz
*Assistant Examiner* — Matthew Hoover
(74) *Attorney, Agent, or Firm* — Hovey Williams LLP

(57) ABSTRACT

A method and part forming apparatus configured for forming an aircraft stringer. The part forming apparatus may comprise a forming tool, a rigid plate, and a hollow bladder. The forming tool may comprise a material trough, a bladder extension trough laterally aligned with and open to the material trough, and a recessed pocket extending from either side of the bladder extension trough and adjacent to the material trough. The method comprises placing composite material into the material trough, placing the bladder onto the composite material and through the bladder extension trough, placing the rigid plate into the recessed pocket and over the bladder, and then placing skin laminate over the bladder and the composite material. Once each of these components is in place, the forming tool may be vacuum bagged and the composite material and skin laminate may be co-cured to form the stringer.

16 Claims, 4 Drawing Sheets

METHOD AND TOOLING FOR MANUFACTURE OF CO-CURED COMPOSITE STRUCTURES

BACKGROUND

1. Field

Embodiments of the present invention relate to a method and apparatus for co-curing composite stringers.

2. Related Art

Aircraft stringers are elongated, thin strips of wood, metal, or carbon fiber to which a skin of an aircraft is fastened. For example, stringers can be attached within nacelles, fuselages, or wings of an aircraft to provide strength and support to the structure. Until recently, most stringers have been formed of metal. Now many stringers are formed of composite materials to reduce the aircrafts weight.

Some composite stringers are hollow and have a substantially trapezoid-shaped cross-section, which may be fixed or cured to a skin laminate. Furthermore, the skin laminate may serve as one of the stringer's walls. The skin laminate wall is typically wider and longer than the rest of the stringer walls, forming a plurality of flanges extending in a plurality of directions outward from the stringer. These flanges are used to attach the stringer to adjoining fuselage structure.

One method of producing a composite stringer includes the steps of placing uncured stringer charges or plies of composite material in a trough of a lay-up tool. The trough may include a base surface and two side surfaces extending upward therefrom at an angle above zero and below 90 degrees. Then a flexible hollow bladder is placed into the trough, over the composite material, and an uncured skin laminate is placed atop the bladder, mating with peripheral portions of the composite material. A vacuum bag is then placed over the skin laminate and sealed to the lay-up tool. Vacuum and heat via an autoclave can then be used to co-cure the composite material and the skin laminate into a monolithic structure. Pressure is provided against an internal surface of the stringer by the bladder and to an external surface of the skin laminate by the vacuum bag.

During the cure cycle, the bladder must be vented to the autoclave so that pressure is applied to the inside of the stringers. The bladders are generally vented out one or both opposing ends of the stringer. The flanges formed by the skin laminate proximate each of the opposing ends of the stringer must be smooth and precisely shaped. Because the bladder is being vented in the vicinity of these flanges, maintaining the smoothness and pressure desired is difficult.

Accordingly, there is a need for an apparatus and method for forming a co-cured stringer that overcomes the limitations of the prior art.

SUMMARY

Embodiments of the present invention provide a part forming apparatus for co-curing composite material with skin laminate to form an aircraft stringer or other elongated hollow parts. The part forming apparatus may comprise a forming tool, a rigid plate, and a hollow bladder. Furthermore, the part forming apparatus may be used in conjunction with a vacuum bag and/or an autoclave for co-curing of the hollow parts.

The forming tool may comprise a top surface and cavities formed into the top surface. The cavities may comprise an elongated material trough, a bladder extension trough laterally aligned with and open to the material trough, and a recessed pocket. The material trough may comprise a bottom wall, two side walls extending upward from the bottom wall, and two flange recesses extending outward from the side walls. The bladder extension trough may comprises opposing side walls, and the recessed pocket may comprise a first portion and a second portion, each located adjacent to and opening into the opposing side walls of the bladder extension trough. Furthermore, the first and second portions of the recessed pocket may be adjacent to the flange recesses of the material trough. The width and/or depth of the bladder extension trough may gradually increase in a direction away from the material trough.

The rigid plate may have a top surface and a bottom surface. The rigid plate may be shaped and configured to rest within the recessed pocket such that the top surface of the rigid plate is substantially flush with the top surface of the forming tool. When the rigid plate is placed into the recessed pocket, it may extend over the bladder extension trough. The rigid plate may comprise a middle portion configured to extend over the bladder extension trough and two side portions configured to mate with and nest in the recessed pocket. The middle portion of the rigid plate may have a thickness that gradually increases in a direction away from the material trough.

The hollow bladder may be inflatable and sized and configured to extend through the elongated material trough and the bladder extension trough. The hollow bladder may be configured to rest between the rigid plate and the bladder extension trough when the rigid plate rests within the recessed pocket.

A method of forming a hollow, elongated part, such as a stringer, may comprise a step of placing a composite material onto a forming tool within a material trough formed in the forming tool. Next, the method may comprise the steps of placing a hollow, flexible bladder over the composite material such that the bladder extends through the material trough and into an adjacent bladder extension trough laterally aligned with the material trough, and then placing a rigid plate onto the forming tool, over the bladder at or proximate to an end of the material trough.

The method may further comprise the steps of placing a skin laminate over the composite material, at least a portion of the bladder, and at least a portion of the rigid plate, and then sealing a flexible, impermeable sheet of material, such as a vacuum bag, to the forming tool. For example, the impermeable sheet may extend over the skin laminate and cooperatively form an air tight pocket with the forming tool and/or the bladder. The method may then comprise a step of removing atmosphere from between the impermeable sheet and the forming tool and/or the bladder. In this way, the composite material and skin laminate may be compressed together, compressed against the forming tool, and/or compressed between the bladder and the impermeable sheet or vacuum bag. Then the method may comprise a step of co-curing the composite material and the skin laminate together via heat and pressure, thereby forming the hollow, elongated part. Finally, the method may comprise a step of cutting off a portion of the cured skin laminate along a cutting groove formed into the rigid plate This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
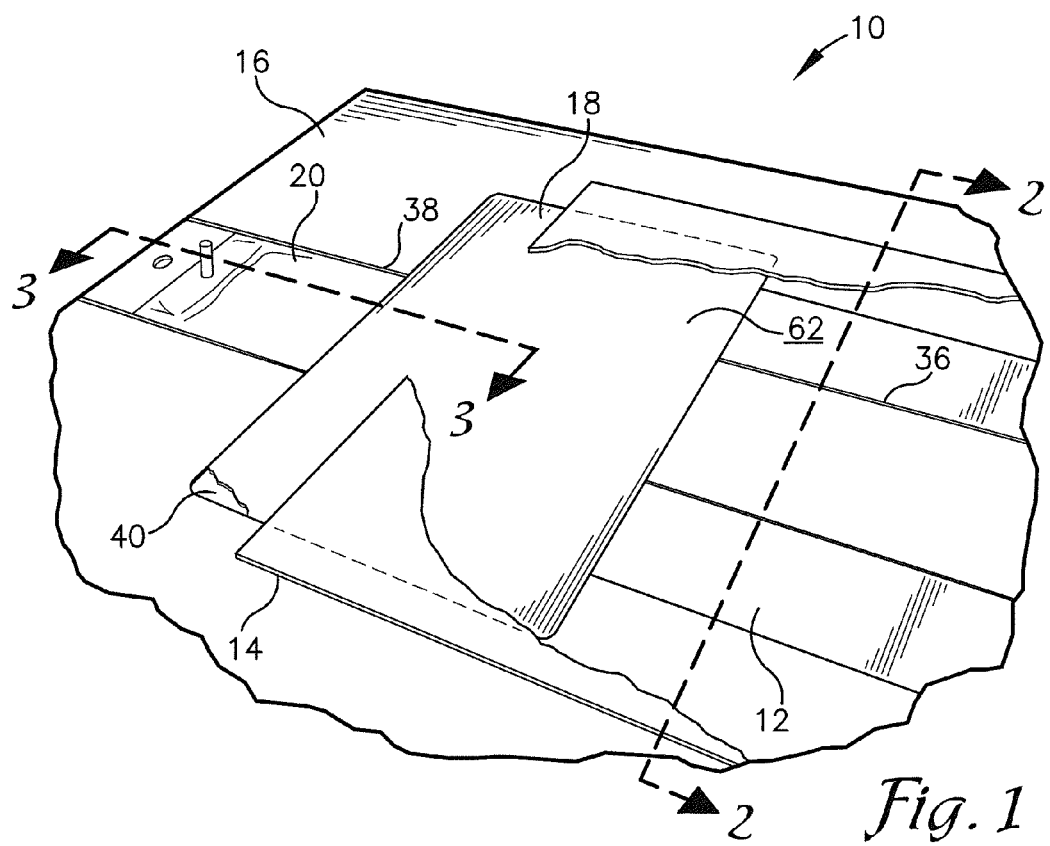
FIG. 1 is a fragmentary top perspective view of a part forming apparatus constructed in accordance with an embodiment of the present invention, comprising a rigid plate placed over a hollow bladder nested in a forming tool.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

FIGS. 1-4 illustrate a part forming apparatus 10 for co-curing composite material 12 with skin laminate 14 to form an aircraft stringer or other hollow, elongated parts, according to various embodiments of the present invention. The part forming apparatus may comprise a forming tool 16, at least one rigid plate 18, and a hollow bladder 20. Furthermore, the part forming apparatus 10 may be used in conjunction with a vacuum bag 22 and/or an autoclave (not shown).

Figure 2:
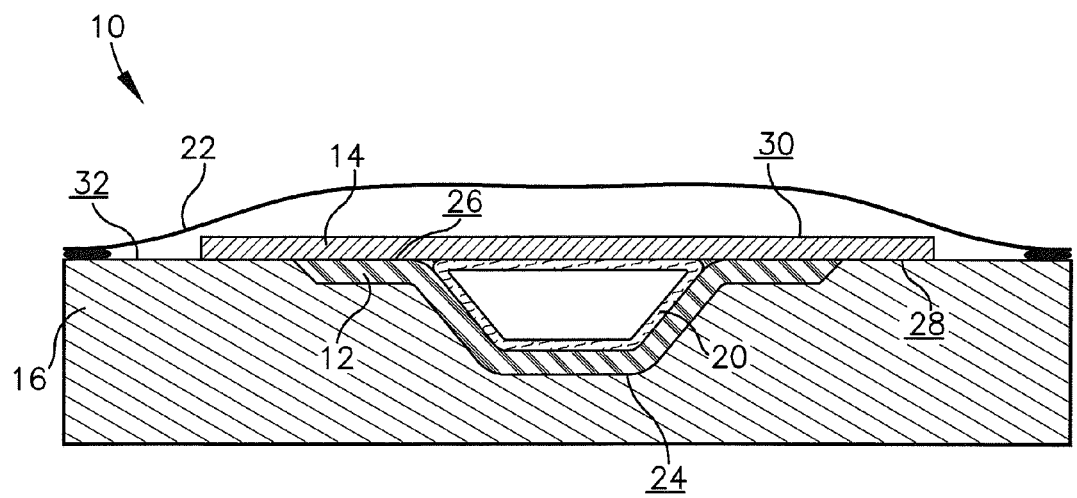
FIG. 2 is a cross-sectional elevation view of the part forming apparatus of FIG. 1.

As illustrated in FIG. 2, the composite material 12 may be one or more plies of any uncured composite material and may comprise a bottom surface 24 placed against the forming tool 16 and a top surface 26 opposite of the bottom surface 24. The skin laminate 14 may be one or more plies of any composite material, and may comprise a bottom surface 28 contacting the composite material 12 and the forming tool 16, and a top surface 30 opposite of the bottom surface 28.

Figure 4:
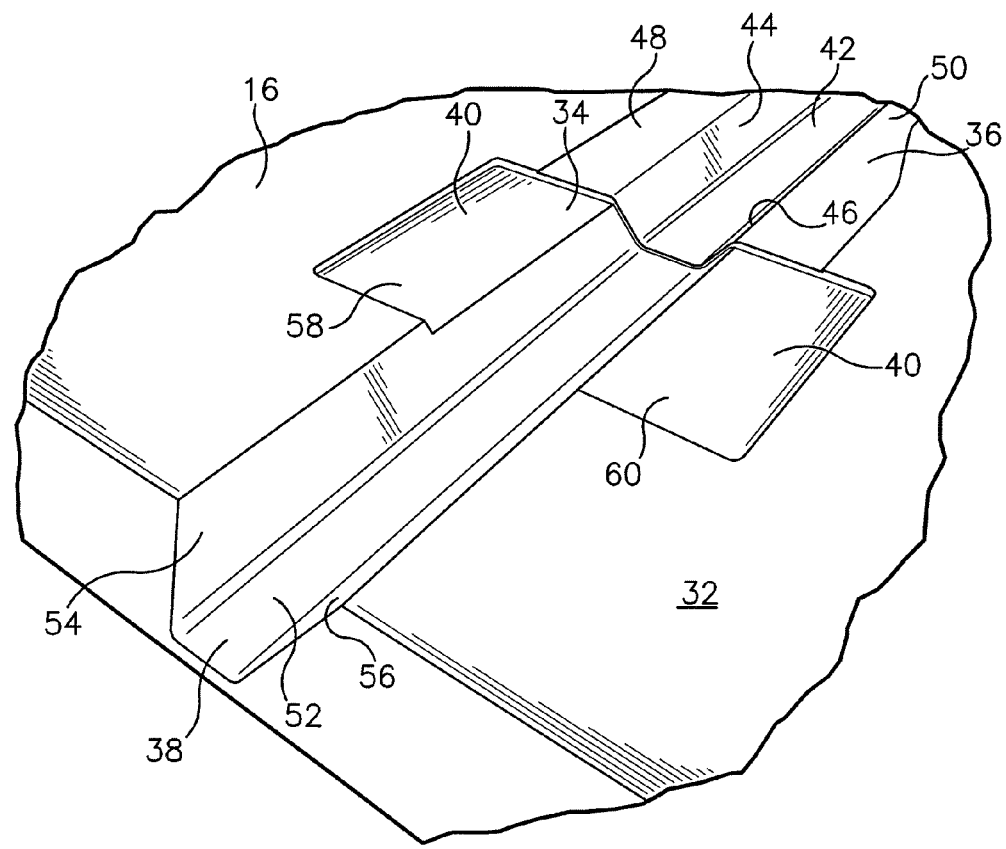
FIG. 4 is a fragmentary top perspective view of the forming tool of FIG. 1, including a material trough, a recessed pocket, and a bladder extension trough.
Figure 6:
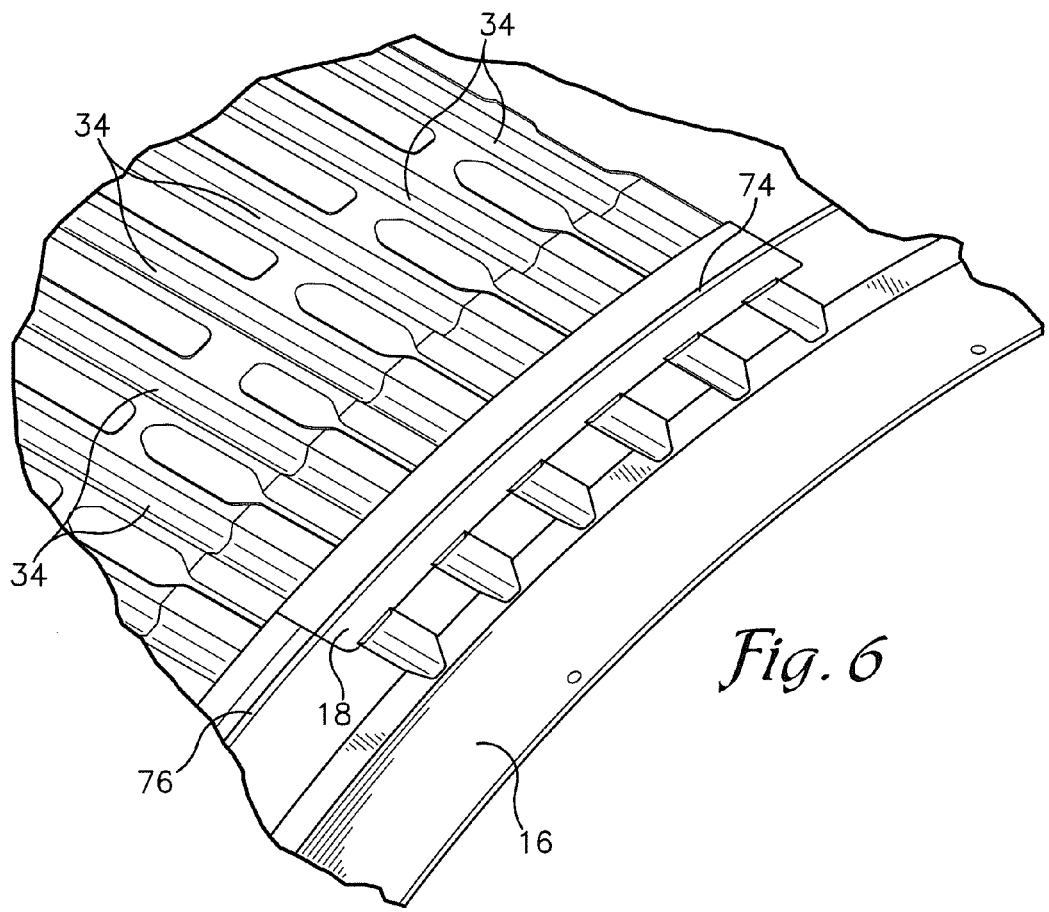
FIG. 6 is a fragmentary top perspective view of an alternative forming tool constructed in accordance with an embodiment of the present invention, illustrating an alternative embodiment of the rigid plate extending over a plurality of channels formed into the alternative forming tool.

The forming tool 16, as best illustrated in FIG. 4, may be made of any rigid material and may comprise a top surface 32 and a plurality of cavities 34 formed into the top surface 32. The cavities 34 may include a material trough 36, at least one bladder extension trough 38, and at least one recessed pocket 40. The material trough 36 may be shaped and configured to form a composite part, such as a stringer, having any cross-sectional shape, such as a trapezoid, triangle, circle, etc. In some embodiments of the invention, the material trough 36 may have a bottom wall 42, two side walls 44,46 extending upward from the bottom wall 42, and/or two flange recesses 48,50 extending outward from the side walls 44,46. In some embodiments of the invention, the side walls 44,46 may extend upward from the bottom wall 42 at an angle above zero and below 90 degrees. When the composite material 12 is placed into the material trough 36, the top surface 26 of the composite material 12 placed in the flange recesses 48,50 may rest flush with the top surface 32 of the forming tool 16. Alternatively, the flange recesses 48,50 may be omitted or may be continuous or partially-continuous with flange recesses of adjacent material troughs. For example, as illustrated in FIG. 6, the forming tool may comprise a plurality of cavities positioned adjacent each other for forming a plurality of stringers.

Each bladder extension trough 38 may comprise a bottom wall 52 and two side walls 54,56. The bladder extension trough 38 may gradually increase in width and/or depth relative to the top surface 32 of the forming tool 16 in a direction away from the material trough 36. In some embodiments of the invention, the material trough 36 may be bordered at opposing ends by a first bladder extension trough 38 and a second bladder extension trough (not shown), and by a first recessed pocket 40 and a second recessed pocket (not shown). The material trough 36 and the bladder extension trough 38 may be a single continuous trough and/or may be laterally aligned. For example, in one embodiment of the invention, the bladder 20 may extend from one distal end of the first bladder extension trough 38, through the material trough 40, and to another distal end of the second bladder extension trough (not shown).

The recessed pocket 40 may be sized and shaped to receive the rigid plate 18. The recessed pocket 40 may comprise first and second portions 58,60 bordering and opening into opposing side walls 54,56 of the bladder extension trough 38, such that, when the rigid plate 18 is placed in both portions 58,60 of the recessed pocket 40, the bladder 20 may extend beneath the rigid plate 18 within the bladder extension trough 38. Furthermore, the first and second portions 58,60 of the recessed pocket 40 may boarder the flange recesses 48,50 of the material trough 36, as illustrated in FIG. 3, such that the top surface 26 of the composite material 12 placed therein may rest flush with the rigid plate 18 placed in the recessed pocket 40.

The rigid plate 18, as illustrated in FIGS. 1-3 and 5, may be made of any rigid material and may comprise a top surface 62 and a bottom surface 64. The rigid plate 18 may be substantially square or rectangular, with or without rounded corners, and may have any thickness required to handle a given amount of heat and pressure, such as the heat and pressure applied within the autoclave while curing the stringer. As mentioned above, the top surface 62 of the rigid plate 18 may be configured to rest flush with the top surface 32 of the forming tool 16 when placed in the recessed pocket 40 of the forming tool 16. In some embodiments of the invention, as illustrated in FIG. 6, the rigid plate 18 may comprise a length or width large enough to rest over a plurality of bladder extension troughs formed in a single forming tool with a plurality of cavities for making a plurality of stringers.

Figure 5:
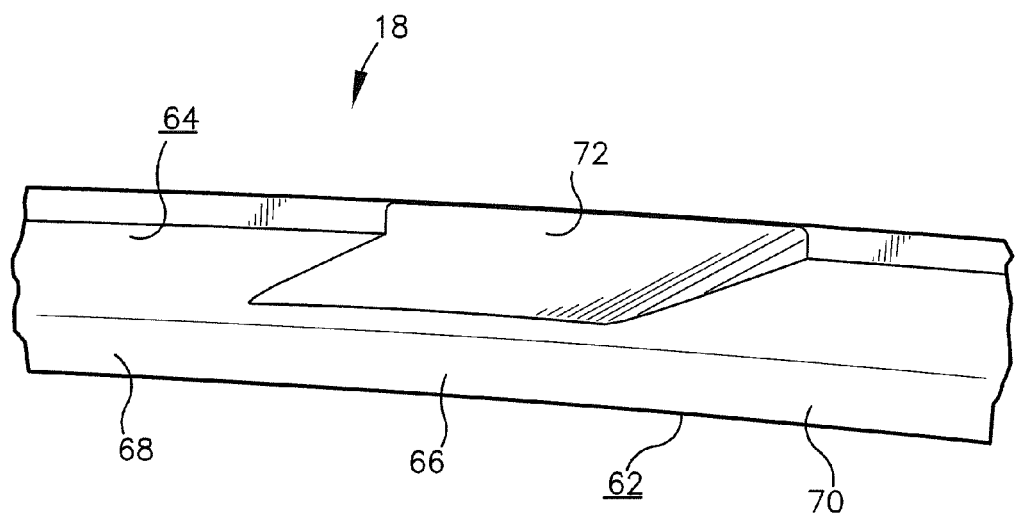
FIG. 5 is a fragmentary bottom perspective view of the rigid plate of FIG. 1 viewed at an end configured to rest substantially adjacent to the material trough of FIG. 4.

As illustrated in FIG. 5, the rigid plate 18 may comprise a middle portion 66 extending over the bladder extension trough 38 and two side portions 68,70 mating with and configured to nest within the recessed pocket 40. The middle portion 66 of the rigid plate 18 may have a gradually increasing thickness in a direction away from the material trough 36, forming a wedge-shaped section 72. The side portions 68,70 of the rigid plate 18 may each have a uniform thickness throughout. For example, the side portions 68,70 of the rigid plate 18 may have a thickness which corresponds with a thickest point of the middle portion 66 of the rigid plate 18. The thickest point of the middle portion 66 of the rigid plate 18 may be located at an end thereof located furthest away from the material trough 36 when placed into the recessed pocket 40. Alternatively, the entire rigid plate 18 may have a gradually increasing thickness in the direction away from the material trough 36 and the recessed pocket 40 may have a gradually increasing depth corresponding to the thickness of the rigid plate 18.

Figure 3:
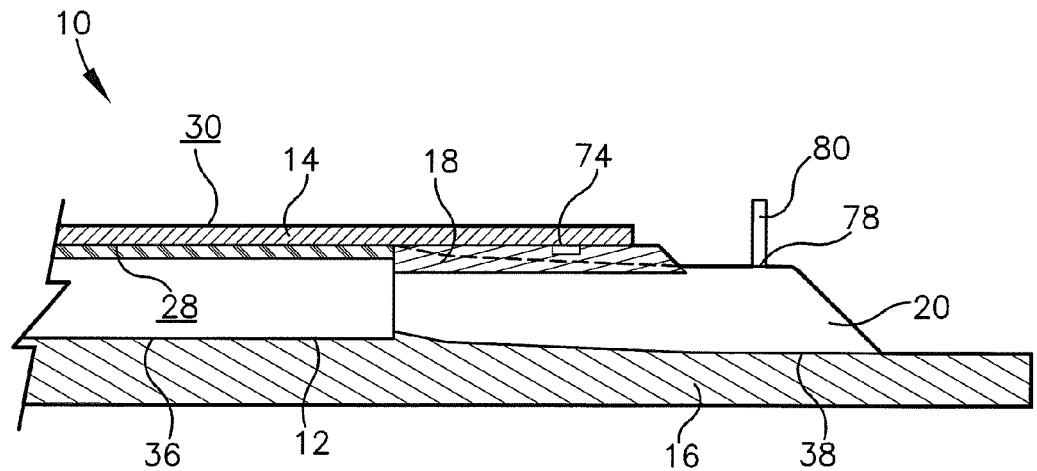
FIG. 3 is a fragmentary, cross-sectional side view of the part forming apparatus of FIG. 1.

As illustrated in FIGS. 3 and 6, the rigid plate 18 may further comprise a cutter groove 74 filled with sacrificial material, such as the peripheral groove described in U.S. Pat. No. 5,746,553, hereby incorporated by reference in its entirety. The cutter groove 74 may be formed into the top surface 62 of the rigid plate 18 such that it mates with a portion of the skin laminate 14 laid thereon. The skin laminate 14 may be cut along a line corresponding to the cutter groove 74 after co-curing the skin laminate 14 to the composite material 12. The sacrificial material in the cutter groove 74 may be any type of potting compound, filler material, or any other material which may be cut into in order to release the skin laminate 14 from the rigid plate 18. Additionally or alternatively, as illustrated in FIG. 6, a similar forming tool cutter groove 76 may be formed into the top surface 32 of the forming tool 16 and may, together with the cutter groove 74 of the rigid plate 18, define a desired boundary of the skin laminate 14 of the stringer or of a plurality of stringers being formed on the part forming apparatus 10. After co-curing the skin laminate 14 and composite material 12 together, the skin laminate 14 may be trimmed along the boundary formed by the cutter grooves 74,76.

The bladder 20, as illustrated in FIGS. 1-3, may be a hollow, elongated component made of any substantially impermeable, flexible, and/or expandable material. The bladder 20 may also be substantially sized and shaped to fit into and through the material trough 36 and the at least one bladder extension trough 38. The bladder 20 may also comprise at least one vent opening 78, as illustrated in FIG. 3, formed therein to allow air or other gasses inward of the hollow bladder 20 to vent to an autoclave or external environment outside the vacuum bag 22, thus inflating the bladder 20 outward and or suctioning the bladder 20 outward against the composite material 12 and the skin laminate 14. In some embodiments of the invention, there may be at least one vent opening 78 proximate to each end of the bladder. Particularly, the vent opening 78 may be in a portion of the bladder 20 extending outward past the rigid plate 18. The vent opening 78 may comprise a vent pipe 80, which may extend through or outward of the vacuum bag.

As illustrated in FIG. 2, the vacuum bag 22 may be any flexible, impermeable sheet of material which may extend over the skin laminate 14, composite material 12, hollow bladder 20, and at least a portion of the forming tool 16. A peripheral seal 82 may be formed between the vacuum bag 22 and the forming tool 16 around the troughs 36,38, the skin laminate 14, the composite material 12, and the hollow bladder 20. When air or atmosphere is removed from between the vacuum bag 22 and the forming tool 16 and/or between the vacuum bag 22 and the hollow bladder 20, the vacuum bag 22 may compress the composite material 12 and/or the skin laminate 14 against the forming tool 16 and/or against the bladder 20.

The autoclave (not shown) may be any sort of industrial autoclave known in the art. Specifically, the autoclave may be a pressure vessel which may expose the part forming apparatus 10, skin laminate 14, and composite material 12 to elevated temperatures while under pressure. In some alternative embodiments of the invention, pressure and heat required to co-cure the composite material 12 and the skin laminate 14 may be provided using other apparatuses and methods known in the art.

In use, the uncured composite material 12 is draped over and conformed to the shape of the material trough 36 in the forming tool 16, with edges of the material 12 extending to an outer boundary of the material trough 36. The bladder 20 is placed onto the composite material 12 within the material trough 36 and has portions which extend into the bladder extension trough 38. The rigid plate 18 is placed into the recessed pocket 40 over the bladder 20. The skin laminate 14 may then be placed onto the forming tool 16, extending across the material trough 36. Specifically, the skin laminate 14 may contact and extend over the composite material 12 located in the flange recesses 48,50 of the material trough 36, and may extend over the bladder 20. Furthermore, portions of the skin laminate 14 may extend onto at least a portion of the rigid plate 18. For example, the skin laminate 14 may extend slightly past the cutter groove 74.

Once the laminate skin 14 is in place, the vacuum bag 22 may be placed over each of the elements on the forming tool 16 and sealed to the forming tool 16. In some embodiments of the invention, the vent pipe 80 may extend outward of the vacuum bag 22. Then the entire part forming apparatus 10 may be compressed by removing air from between the vacuum bag 22 and the bladder 20 and/or between the vacuum bag 22 and the forming tool 16. Additionally, or alternatively, the part forming apparatus 10 may be placed into the autoclave to provide pressure and heat for co-curing the composite material 12 with the skin laminate 14 to form a stringer or another hollow part.

Figure 7:
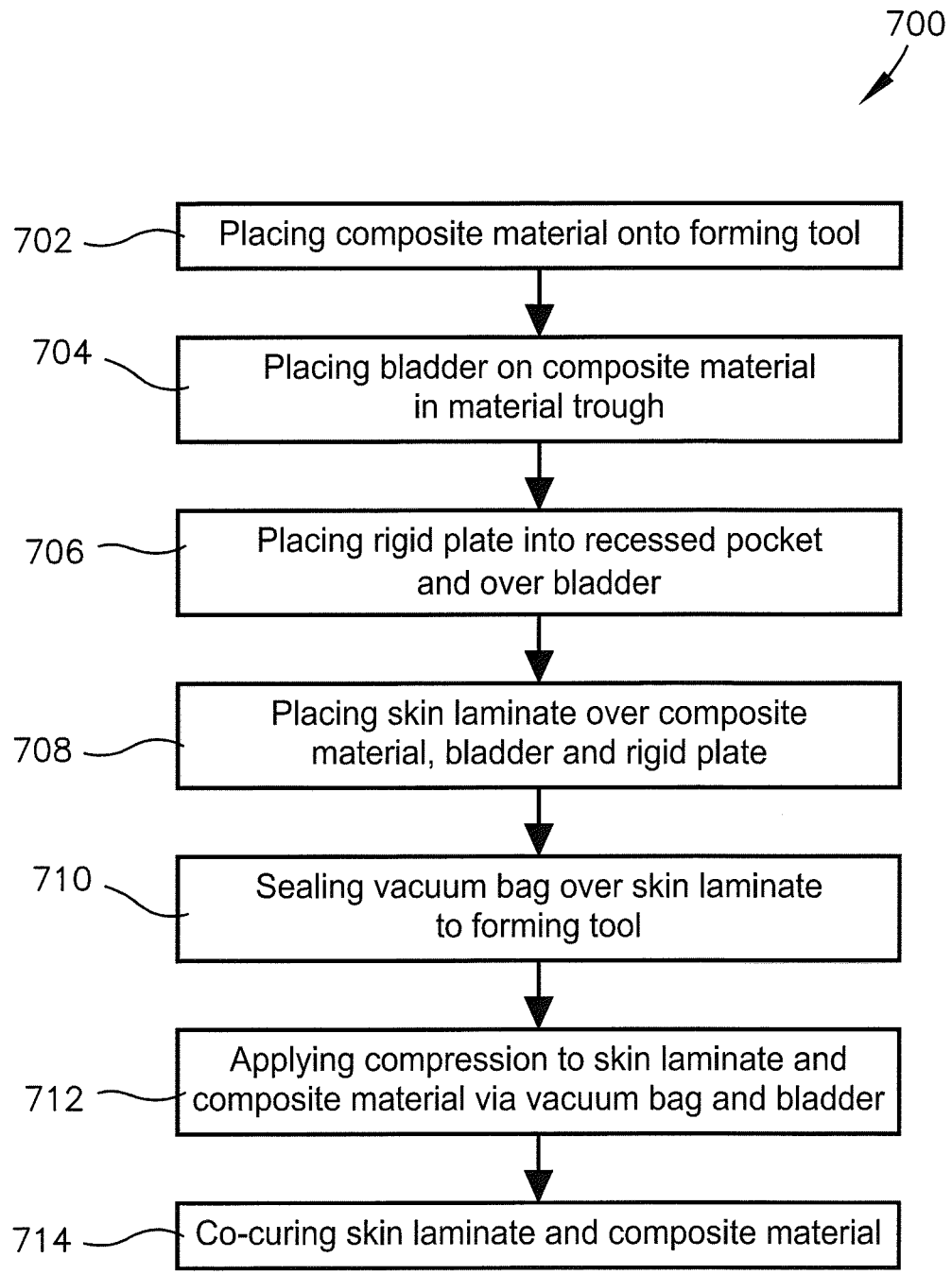
FIG. 7 is a flow chart of a method for forming a hollow part in accordance with an embodiment of the present invention.

The flow chart of FIG. 7 depicts the steps of an exemplary method 700 for forming a stringer in more detail. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved.

As illustrated in FIG. 7, the method 700 may include a step of placing the composite material 12 onto the forming tool 16, as depicted in block 702. Specifically, the composite material 12 may be placed in the material trough 36, as discussed above, with the top surface 26 of the composite material 12 resting flush with the top surface 32 of the forming tool 16. Next, the method may comprise a step of placing the bladder 20 on top of the composite material 12, as depicted in block 704. The bladder 20 may be placed on top of the composite material 12 such that it extends through both the material trough 36 and the bladder extension trough 38.

Then, the method 700 may comprise a step of placing the rigid plate 18 onto the forming tool 16 and/or into the recessed pocket 40, as depicted in block 706. In alternative embodiments of the invention, if the recessed pocket 40 is omitted, the rigid plate 18 may be placed proximate and/or adjacent to an end edge of the composite material 12.

The method 700 may also comprise a step of placing the skin laminate 14 onto the forming tool 16 and over the bladder 20, the composite material 12, and at least a portion of the rigid plate 18, as depicted in block 708. Specifically, the skin laminate 14 may be wider and longer than the material trough 36 and may extend over the cutter grooves 74,76 formed into the rigid plate 18 and/or the forming tool 16. Next, the method may comprise sealing the vacuum bag 22 to the forming tool 16, as depicted in block 710, such that an air-tight pocket is formed between the vacuum bag 22, the forming tool 16, and/or the bladder 20. The vacuum bag 22 may extend over the skin laminate 14. Finally, the method 700 may comprise the steps of removing air from between the vacuum bag 22, forming tool 16, and/or bladder 20, providing compression force to the composite material 12 and skin laminate 14, as depicted in block 712, and then co-curing the composite material 12 and skin laminate 14 together via heat and pressure, thereby forming a monolithic stringer, as depicted in block 714.

Although the invention has been described with reference to the preferred embodiment illustrated in the attached drawing figures, it is noted that equivalents may be employed and substitutions made herein without departing from the scope of the invention as recited in the claims. For example, the method described herein of co-curing portions of differing materials using a rigid plate to reinforce flange portions may be used to form other hollow components having one or more open ends.

Having thus described various embodiments of the invention, what is claimed as new and desired to be protected by Letters Patent includes the following:

The invention claimed is:

1. A method of forming a hollow, elongated part, the method comprising:
   placing a composite material onto a forming tool within a material trough formed in the forming tool;
   placing a hollow, flexible bladder over the composite material such that the bladder extends through the material trough and into an adjacent bladder extension trough formed in the forming tool and laterally aligned with the material trough;
   placing a rigid plate onto the forming tool, over the bladder at or proximate to an end of the material trough;
   placing a skin laminate over the composite material, at least a portion of the bladder, and at least a portion of the rigid plate;
   sealing a flexible, impermeable sheet of material to the forming tool, such that the impermeable sheet extends over the skin laminate and cooperatively forms an air tight pocket with at least one of the forming tool and the bladder;
   removing atmosphere from between the impermeable sheet and at least one of the forming tool and the bladder, thereby compressing the composite material and skin laminate;
   co-curing the composite material and the skin laminate together via heat and pressure, thereby forming the hollow, elongated part; and
   removing the skin laminate from the rigid plate.

2. The method of claim 1, wherein the hollow, elongated part is a stringer.

3. The method of claim 1, wherein placing the rigid plate onto the forming tool comprises placing the rigid plate into a recessed pocket of the forming tool, the recessed pocket being sized and shaped such that a top surface of the rigid plate rests flush with the composite material when the rigid plate is placed into the recessed pocket.

4. The method of claim 1, wherein at least one of a width and a depth of the bladder extension trough gradually increases along a length of the bladder extension trough such that at least one of the width and the depth of the bladder extension trough is smaller at a location immediately adjacent to the material trough than at a location spaced lengthwise apart from the material trough.

5. The method of claim 3, wherein the bladder extension trough comprises opposing side walls, wherein the recessed pocket comprises a first portion and a second portion, each positioned to border and open into the opposing side walls of the bladder extension trough.

6. The method of claim 5, wherein the material trough comprises a bottom wall, two side walls extending upward from the bottom wall, and two flange recesses extending outward from the side walls, wherein the first and second portions of the recessed pocket substantially boarder the flange recesses of the material trough.

7. The method of claim 3, wherein the rigid plate comprises a middle portion configured to extend over the bladder extension trough and two side portions configured to mate with and nestle into the recessed pocket, wherein the middle portion of the rigid plate has a thickness that gradually increases in a direction away from the material trough such that the middle portion is thinner at a first location of the rigid plate adjacent to the material trough than at a second location of the rigid plate spaced a distance apart from the material trough.

8. The method of claim 7, wherein the side portions of the rigid plate each have a uniform thickness.

9. The method of claim 1, wherein the impermeable sheet is a vacuum bag.

10. The method of claim 1, wherein the bladder comprises at least one vent opening therein, located in or proximate to the bladder extension trough.

11. A method of forming a hollow stringer, the method comprising:
   placing a composite material onto a forming tool within a material trough formed in the forming tool;
   placing a hollow, flexible bladder over the composite material such that the bladder extends through the material trough and into an adjacent bladder extension trough formed in the forming tool and laterally aligned with the material trough;
   placing a rigid plate onto a recessed pocket of the forming tool, such that the rigid plate extends over the bladder at or proximate to an end of the material trough;
   placing a skin laminate over the composite material, at least a portion of the bladder, and at least a portion of the rigid plate;
   sealing a vacuum bag to the forming tool, such that the vacuum bag extends over the skin laminate and cooperatively forms an air tight pocket with at least one of the forming tool and the bladder;

removing atmosphere from between the vacuum bag and at least one of the forming tool and the bladder, thereby compressing the composite material and skin laminate;

co-curing the composite material and the skin laminate together via heat and pressure, thereby forming the hollow, elongated part; and removing the skin laminate from the rigid plate.

12. The method of claim 11, further comprising cutting off a portion of the skin laminate after cure along a cutter groove formed into the rigid plate, wherein the cutter groove is formed into the rigid plate prior to placing a skin laminate over the composite material, at least a portion of the bladder, and at least a portion of the rigid plate.

13. The method of claim 12, wherein the cutter groove is filled with sacrificial material.

14. The method of claim 1, wherein the bladder extension trough comprises opposing side walls spaced apart from each other, wherein a distance between the opposing side walls of the bladder extension trough gradually widens along a length of the bladder extension trough.

15. The method of claim 1, wherein the bladder extension trough has a variable depth that gradually deepens along a length of the bladder extension trough.

16. The method of claim 3, wherein the rigid plate comprises a middle portion configured to extend over the bladder extension trough and two side portions configured to mate with and nestle into the recessed pocket, wherein the middle portion of the rigid plate has a thickness that tapers in a direction toward the material trough.

* * * * *